United States Patent [19]

Cooper

[11] Patent Number: 5,895,672
[45] Date of Patent: Apr. 20, 1999

[54] PRODUCT AND PROCESS FOR PREPARING A TEA EXTRACT

[76] Inventor: Barry Patrick Wesley Cooper, 6960 Baseline Road, Boulder, Colo. 80303

[21] Appl. No.: 09/006,585

[22] Filed: Jan. 13, 1998

[51] Int. Cl.[6] .............................. B65B 29/02; A47J 31/24
[52] U.S. Cl. ........................... 426/79; 426/433; 426/435; 426/597; 426/655; 99/291
[58] Field of Search ........................... 426/77, 79, 655, 426/433, 435, 597; 99/291

[56] References Cited

U.S. PATENT DOCUMENTS

| | | | |
|---|---|---|---|
| 4,153,153 | 5/1979 | Herzog | 206/0.5 |
| 4,254,694 | 3/1981 | Illy | 99/295 |
| 4,534,985 | 8/1985 | Gasau | 426/432 |
| 4,756,915 | 7/1988 | Dobry | 426/234 |
| 4,806,375 | 2/1989 | Favre | 426/433 |
| 4,853,234 | 8/1989 | Bentley et al. | 426/77 |
| 4,871,555 | 10/1989 | Schwartz et al. | 426/82 |
| 5,008,013 | 4/1991 | Favre et al. | 210/482 |
| 5,072,661 | 12/1991 | Kondo | 99/296 |
| 5,104,666 | 4/1992 | Sanvitale | 426/77 |
| 5,326,472 | 7/1994 | Combe | 210/455 |
| 5,398,595 | 3/1995 | Fond et al. | 99/295 |
| 5,402,707 | 4/1995 | Fond et al. | 99/295 |
| 5,463,935 | 11/1995 | Zanarini | 99/292 |
| 5,472,719 | 12/1995 | Favre | 426/77 |
| 5,603,254 | 2/1997 | Fond et al. | 99/295 |
| 5,637,335 | 6/1997 | Fond et al. | 426/84 |
| 5,638,740 | 6/1997 | Cai | 99/295 |
| 5,638,741 | 6/1997 | Cisaria | 99/295 |
| 5,672,368 | 9/1997 | Perkins | 426/83 |
| 5,776,527 | 7/1998 | Blanc | 426/77 |
| 5,780,086 | 7/1998 | Kirksey et al. | 426/597 |
| 5,813,318 | 9/1998 | Zanin et al. | 99/291 |

*Primary Examiner*—Nina Bhat
*Attorney, Agent, or Firm*—Sheridan Ross P.C.

[57] ABSTRACT

A novel system for producing a high quality tea extract using espresso technology is provided as well as novel tea compositions for use in such system and a process for preparing a tea extract of consistently high quality using a coffee brewing device, and particularly, an espresso machine.

26 Claims, 3 Drawing Sheets

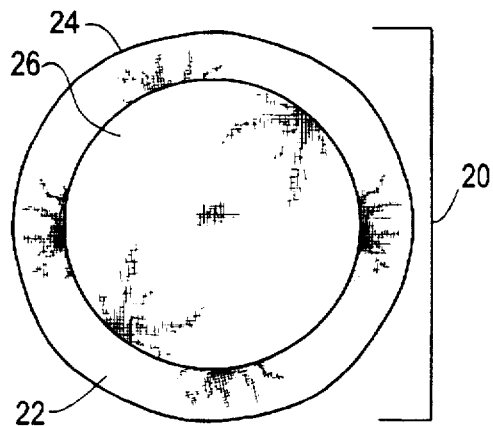
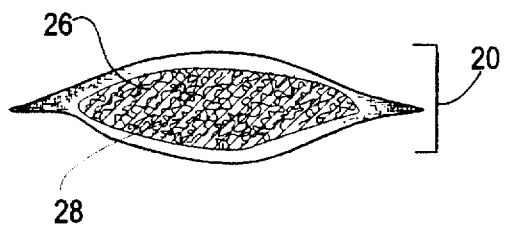
FIG. 1A
FIG. 1B
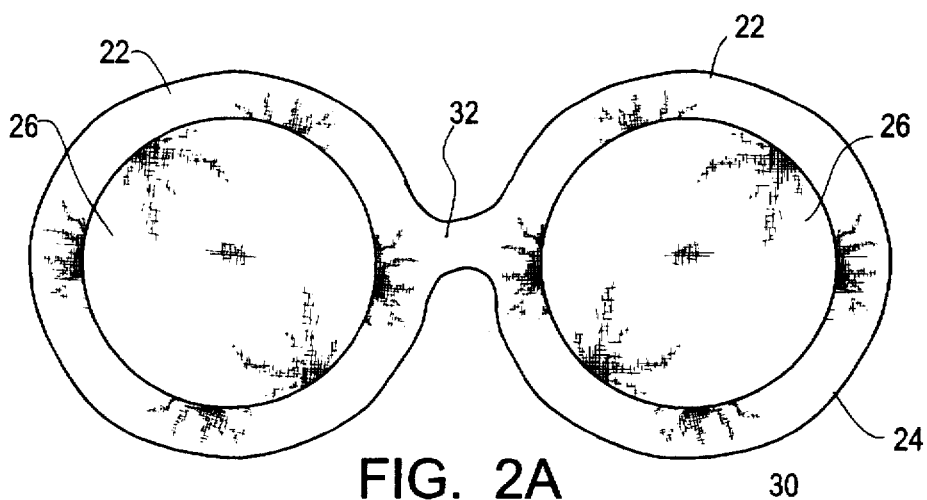
FIG. 2A
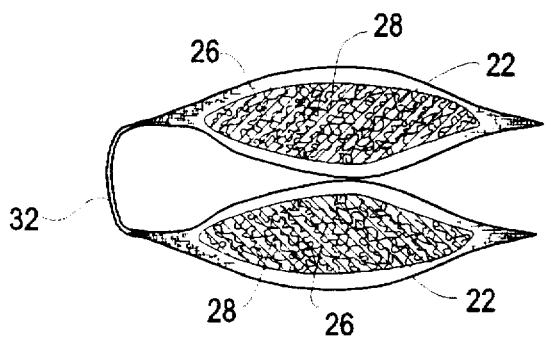
FIG. 2B

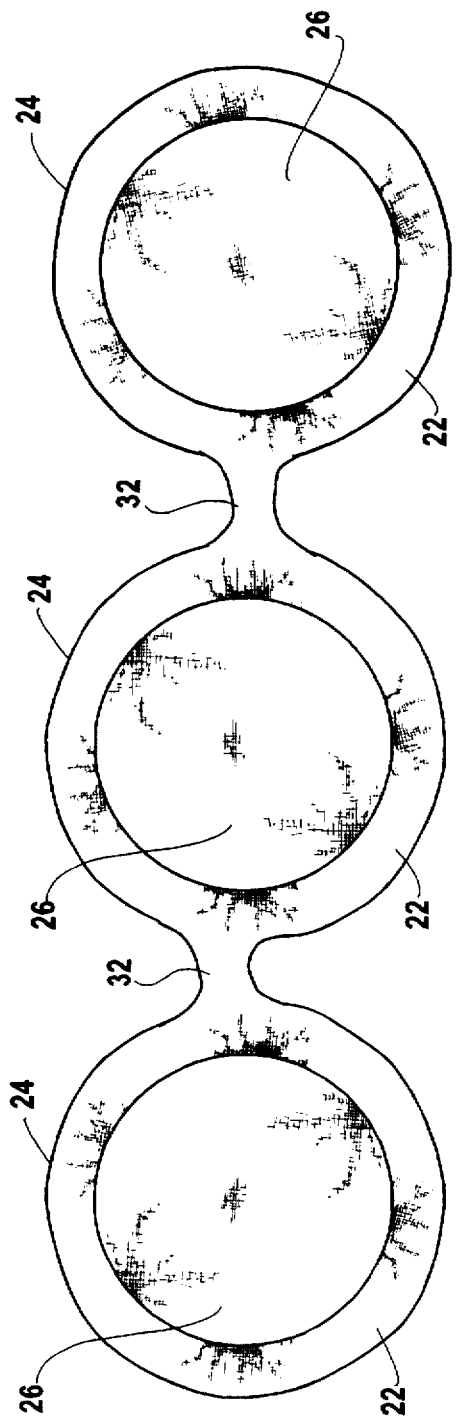
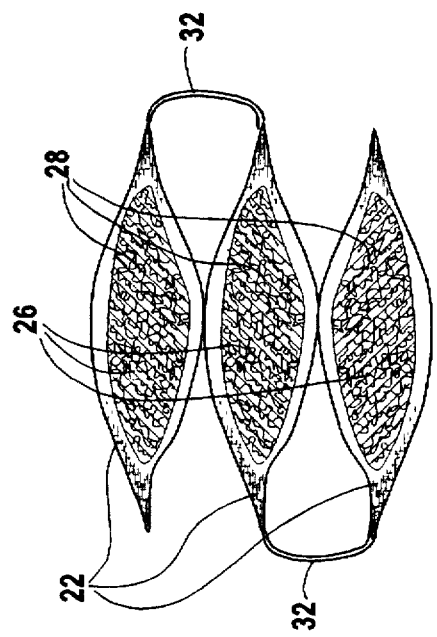
FIG. 3A
FIG. 3B 5,895,672

1

PRODUCT AND PROCESS FOR PREPARING A TEA EXTRACT

FIELD OF THE INVENTION

The present invention generally relates to a product and process for preparing a tea extract. More particularly, the present invention relates to a novel tea extract system including a tea composition for use in such system and to a process for preparing a tea extract of consistently high quality using a coffee brewing device, and particularly, an espresso machine.

BACKGROUND OF THE INVENTION

In recent years, the coffee beverage market has enjoyed increased favor worldwide. Numerous espresso bars and coffee shops have capitalized on the popularity of coffee-based beverages (e.g., espresso, cappuccino, latte), and are now beginning to explore other types of beverages. The market for hot and iced tea beverages is enjoying new found popularity in many areas of the world, and in particular, in the United States. Prior to the present invention, however, offering a wide variety of freshly brewed teas to the public, particularly iced teas, teas containing mixtures of ingredients, and teas requiring extra preparation steps (e.g., Chai teas), has been problematic, because of the time required to brew each type of tea, combined with the inability to keep a large selection of such tea preparations on hand at one time. In addition, micro-contamination of storage tanks and tea dispensers which are commonly used to store bulk amounts of a single type of tea for iced tea service is problematic in many restaurants.

The desire to be able to quickly produce a wide variety of coffee beverages having a consistent, reproducible, high quality has led to the development of a variety of coffee/espresso machines and accessories, as well as expertise in the coffee beverage industry. With the expansion of the tea market, there is clearly a similar need to provide expertise and product technology that will extend the retail tea brewing industry beyond the traditional "tea bag".

With the number of cafes, restaurants, and retail outlets preparing and serving beverages which are prepared in espresso machines, there was a need for standardizing the preparation of espresso beverages to compensate for the wide variations in experience among espresso machine operators and in the espresso machines themselves. In response to this need, a variety of espresso machines and coffee brewing containers, or "pods", have been disclosed which are meant to provide a foolproof, consistent means for making an espresso drink. For example, Illy et al. U.S. Pat. No. 4,254,694, 1981; Fond et al., U.S. Pat. No. 5,637,335, 1997; and Cisaria et al., U.S. Pat. No. 5,638,741, 1997; disclose various espresso machines, coffee "pods", and "pod adapters" for espresso machines. Typically, a coffee pod as described in the above-referenced patents consists of an enclosed water-permeable pod or package which contains a pre-measured amount of ground coffee that is preferably compressed to provide a consistent measure of coffee for production of espresso beverages. These coffee pods and the espresso machine adaptors that are designed to accommodate them are intended to provide a standardized espresso or coffee that can be used to make a variety of coffee drinks.

In the retail market, it would be desirable to be able to use existing coffee/espresso technology to produce high quality tea-based beverages, since it would be expensive and impractical to design an entire new line of machines and products suitable for brewing high quality teas. None of the above-mentioned references, however, discloses how to produce a consistently high quality tea using the technology designed for coffee and espresso beverages. Indeed, the previously described "pod" products and coffee grinds can not be simply extrapolated to the production of tea in an espresso machine. For example, a tea "pod" that is made using the guidelines disclosed for coffee, or merely filled with any tea blend, when extracted in an espresso machine, produces a tea that is weak and tasteless. Moreover, the flavor of any additional spices in a tea blend produced in an espresso machine may be lost.

Since the market for a variety of tea-based beverages that can be prepared in seconds continues to increase, there is a need to provide a product and method of producing a tea extract system for use in the production of a variety of tea beverages which takes advantage of espresso brewing technology. Such products and methods should be consistent, fast, easy, cost efficient, and produce a high quality tea extract for use in a variety of beverages.

SUMMARY OF THE INVENTION

The present invention addresses the need for a product and method for adapting espresso brewing technology to the production of a consistent, high quality tea extract for use in various tea beverages. Moreover, the present invention provides a product and process for the production of customized, single serve, freshly brewed tea beverages of a wide variety which can be prepared in seconds, and which eliminate the need for large tea storage tanks and tea dispensers. More specifically, the present inventors have discovered that adaptation of espresso technology, and particularly coffee "pod" technology, to the production of quality tea extracts can not be accomplished by following the guidance provided for coffee pods and espresso brews as disclosed by others prior to the present invention. The present inventors disclose herein particular cuts of tea leaves, tea blends, a complete tea extract system and a method of using the same in a coffee brewing device, and particularly, an espresso machine, to produce a high quality, consistently reproducible tea extracts in a matter of seconds.

One embodiment of the present invention relates to a tea extract system for production of a serving of tea extract in a coffee brewing device. The tea extract system includes: (a) a tea extraction container for containing a tea composition; and (b) the tea composition. The tea extraction container comprises a sealed body having at least one internal compartment which contains the tea composition. The sealed body, in one embodiment, is constructed of a water-permeable material which allows flow of a fluid through the sealed body to produce a tea extract from the tea composition. The tea composition comprises from about 2 grams to about 10 grams of tea having a particle size of from about 0.40 mm to about 0.75 mm.

The tea is preferably selected from the group including: tea leaves producing a dark strength tea (e.g., black tea, Assam/Kenya teas and mixtures thereof), tea leaves producing a medium strength tea (e.g., Ceylon/Indonesia tea and Oolong tea), tea leaves producing a light strength tea (e.g., South India/Malawi tea), herbs (e.g., cinnamon, ginger, hibiscus, malted barley, chicory, lemon grass, chamomile, fennel, licorice root and mixtures thereof), and mixtures thereof.

In one embodiment the tea composition comprises from about 2 grams to about 10 grams of said tea leaves producing a dark strength tea having a particle size of from about 0.40 mm to about 0.75 mm. In another embodiment, the tea composition comprises from about 2 grams to about 10 grams of said tea leaves producing a medium strength tea having a particle size of from about 0.40 mm to about 0.60 mm. In yet another embodiment, the tea composition comprises from about 2 grams to about 10 grams of said tea leaves producing a light strength tea having a particle size of from about 0.60 mm to about 0.75 mm. In another embodiment, the tea composition comprises from about 2 grams to about 10 grams of said herbs having a particle size of from about 0.45 mm to about 0.75 mm.

A tea extract system of the present invention can also include additional components in addition to the tea composition described above. Such additional components can include: at least one spice, added to the tea composition in an amount from about 5% to about 80%, and preferably, about 40% to about 60% of a total amount of the tea, wherein the spice is ground to a particle size of from about 0.45 mm to about 0.65 mm; a sweetener added in an amount from about 1% to about 70%, and preferably, about 20% to about 60% of a total amount of the tea; a powdered milk added in an amount from about 2% to about 50%, and preferably, about 20% to about 30% of a total amount of the tea; a powdered creamer added in an amount from about 2% to about 50%, and preferably, about 20% to about 30% of a total amount of the tea; a jam in an amount from about 2% to about 50%, and preferably, about 20% to about 50% of a total amount of the tea; preserves added in an amount from about 2% to about 50%, and preferably, about 20% to about 50% of a total amount of the tea; fresh fruits cut or ground to a particle size of from about 0.45 mm to about 0.75 mm, added in an amount from about 2% to about 60%, and preferably, about 20% to about 60% of a total amount of the tea; and mixtures thereof.

In one embodiment of the present invention, the additional components, such as a spice are contained within a different internal compartment of the tea extraction container than the tea. In yet another embodiment, the tea is contained within an internal compartment of a first tea extraction container and an additional component, such as a spice, is contained within an internal compartment of a second tea extraction container. In a further embodiment, the two tea extraction containers are connected to each other by a connecting means. In one particular embodiment, a tea container of suitable dimensions to fit within conventional espresso machines is provided, such container having either layered and/or portioned compartments that are rotatably connected about an axis to provide the ability to separately fill each layer and/or portion with a desired component and then rearrange the layers and/or portions in a vertical manner so that when the unit is placed in an espresso machine compartment, pressurized water/steam can transcend through such layers and into a receptacle. The various layers can then be pivotally rotated around such axis to be filled with a desired amount of tea, herb or spice composition, and then properly aligned in a vertical orientation to fit within the espresso receptacle. Desired cuts of the various components that are added to such a layered receptacle container can be adjusted so that proper drainage of water/steam can be conveyed through the various layers to achieve a desired consistency of tea product within a reasonably short period of time. In a preferred embodiment, the various layers are constructed of a stainless steel material with a perforated bottom and solid sidewalls.

Another embodiment of the present invention relates to a tea extract system for production of a spiced tea extract in a coffee brewing device. This tea extract system includes a tea extraction container as described above, and a tea composition comprising: (i) from about 2 grams to about 10 grams of a tea selected from the group consisting of tea leaves producing a dark strength tea having a particle size from about 0.40 mm to about 0.75 mm; tea leaves producing a medium strength tea having a particle size from about 0.40 mm to about 0.60 mm; tea leaves producing a light strength tea having a particle size from about 0.60 mm to about 0.75 mm; and herbs having a particle size from about 0.50 mm to about 0.75 mm; (ii) at least one spice, added to the tea composition in an amount from about 40% to about 60% of a total amount of the tea, wherein the spice is ground to a particle size of from about 0.45 mm to about 0.65 mm; and, (iii) a sweetener, added in an amount from about 20% to about 60% of a total amount of the tea. In one embodiment, the tea extraction container has three internal compartments, each of said tea, spice, and sweetener being contained in a different internal compartment.

Yet another embodiment of the present invention relates to a tea composition for producing a tea extract in an espresso machine, comprising from about 2 grams to about 10 grams of a tea having a particle size of from about 0.40 mm to about 0.75 mm.

Another embodiment of the present invention relates to a method for producing a tea extract in a coffee brewing device. This method includes the steps of: (a) providing a tea extract system comprising: (i) a tea extraction container and (ii) a tea composition, as described above; (b) placing the tea extraction system into a brewing chamber of a coffee brewing device; and, (c) operating the coffee brewing device to extract a tea extract from the tea composition. The method of the present invention preferably produces a tea extract in less than about 60 seconds after initiating step (a), and more preferably, in less than about 40 seconds.

Yet another embodiment of the present invention relates to a method for preparing a single serving of a customized tea beverage in a coffee brewing device. This method includes the steps of: (a) selecting a customized tea extract system comprising: (i) a first tea extraction container containing a tea composition as described above; and, (ii) at least one optional tea extraction container containing at least one component as described above; (b) placing the first tea extraction container together with the optional tea extraction container(s) into a brewing chamber of a coffee brewing device; and,(c) operating the coffee brewing device to extract a customized tea extract from the tea composition.

Yet another embodiment of the present invention relates to a tea composition for producing a Chai tea extract in an espresso machine. Such a tea composition includes from about 1 to about 4 grams of black tea leaves of a particle size from about 0.40 mm to about 0.75 mm; from about 1 to about 10.5 grams of cinnamon of a particle size from about 0.45 mm to about 0.50 mm; from about 2 to about 4 grams of ginger of a particle size from about 0.50 mm to about 0.75 mm; from about 1 to about 2 grams of cardamom of a particle size from about 0.50 mm to about 0.60 mm; from about 0.5 to about 1 grams of cloves of a particle size from about 0.25 mm to about 0.35 mm; from about 0.1 to about 0.3 grams of nutmeg of a particle size from about 0.10 mm to about 0.15 mm; from about 0.1 to about 0.8 grams of pepper of a particle size from about 0.50 mm to about 0.60 mm; and from about 3 to about 6 grams of a sweetener.

BRIEF DESCRIPTION OF THE DRAWINGS

FIG. 1A is a top view of a single tea extract system of the present invention.

FIG. 1B is a cross-sectional side view of a single tea extract system of the present invention.

FIG. 2A is a top view of a double tea extract system of the present invention.

FIG. 2B is a cross-sectional side view of a folded double tea extract system of the present invention.

FIG. 3A is a top view of a triple tea extract system of the present invention.

FIG. 3B is a cross-sectional side view of a folded triple tea extract system of the present invention.

DETAILED DESCRIPTION OF THE INVENTION

Figure 4:
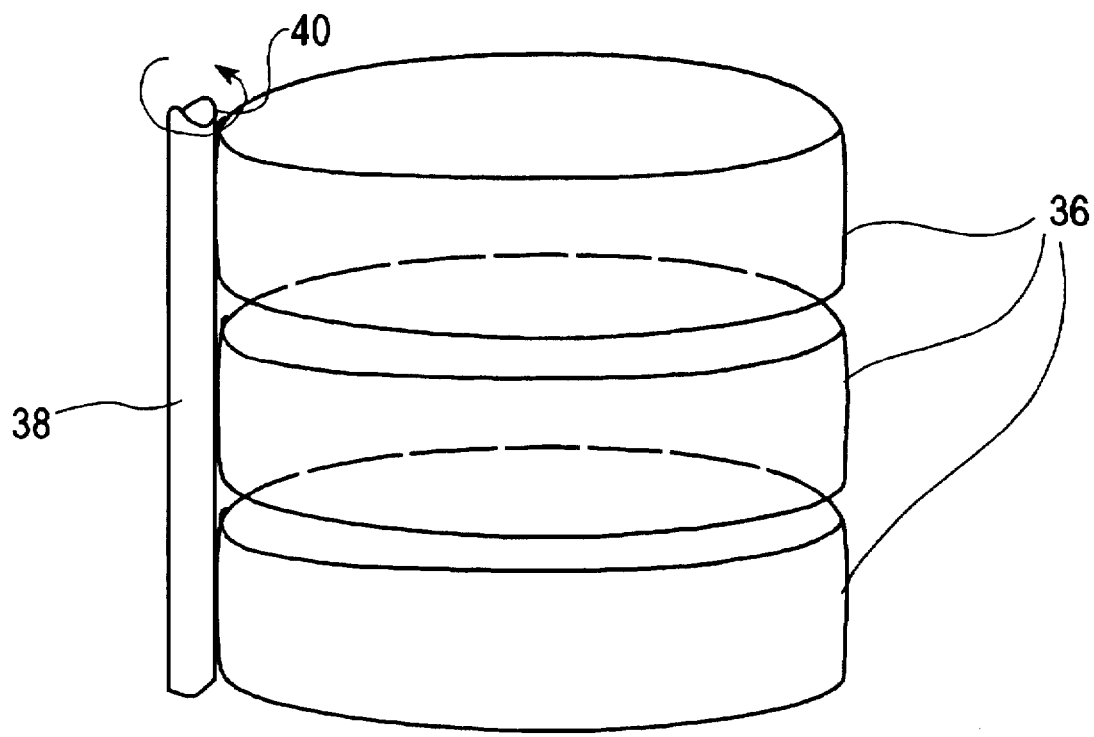
FIG. 4 is a side view of another tea extraction container of the present invention.

The present invention generally relates to a product and method for producing a consistent, high quality tea extract for use in various tea beverages using espresso brewing technology. The tea extraction system and method disclosed herein can be used to produce customized, single service preparations of virtually any type of tea blend or tea beverage, in a very short time (e.g., less than one minute). As discussed above, the present inventors have discovered that adaptation of espresso technology, and particularly coffee "pod" technology, to the production of quality tea extracts can not be accomplished by following the guidance provided for coffee pods and espresso brews as disclosed by others prior to the present invention. The present inventors disclose herein a tea extract system which includes tea extraction containers (e.g., tea pods) containing novel tea compositions and a method of using the same in a coffee brewing device, and particularly, an espresso machine, to produce a high quality, consistently reproducible tea extract.

One embodiment of the present invention relates to a tea extraction system for producing a tea extract in a coffee brewing device, and particularly, an espresso machine. Such a tea extraction system includes: (a) at least one tea extraction container for containing a tea composition and (b) the tea composition.

According to the present invention, a tea extraction container can be any container which includes a sealed body having at least one internal compartment for containing a tea composition. The sealed body is constructed from a water-permeable material which allows a liquid (e.g., water) to flow through the sealed body into the internal compartment such that the liquid contacts the tea composition, thereby extracting the tea composition into the fluid, and then exits the sealed body as a tea extract. The water-permeable material suitable for construction of the sealed body can be any water-permeable material that is suitable for use with a food product, such as filter paper, permeable plastic, tight weave metal mesh, nylon and linen. The water-permeable material can be flexible or rigid. An example of a flexible material is filter paper. An example of a rigid material is tight weave metal mesh. In a preferred embodiment, a tea extraction container is formed from filter paper.

The tea extraction container can be any shape or configuration suitable for use in a coffee brewing device. For example, a tea extraction container useful in the present invention can be in the shape of a circular pod, a square pod, or a basket. Containers suitable for use as a tea extraction container in the present invention are disclosed, for example, in U.S. Pat. No. 5,637,335, supra, or in U.S. Pat. No. 4,254,694, supra, which are incorporated herein by reference in their entirety. Preferably, a tea extraction container useful in the present invention is a circular pod shape. FIGS. 1A and 1B illustrate a circular pod tea extraction container of the present invention. FIG. 1A is a top view of a single tea extraction container (20), showing a sealed body (22) comprised of a water-permeable filter paper, having a sealed edge (24) enclosing an internal compartment (26) which contains the tea composition. FIG. 1B is a cross-sectional side view of the same single extraction container (20), showing the tea composition (28) contained within the internal compartment (26).

The term "sealed body" with regard to the tea extraction container means that the container forms an internal compartment, or space, which completely contains the tea composition and prevents the tea composition from escaping from the internal compartment. As such, the sealed body is can be "sealed" by any means which accomplishes this goal, such as by an adhesive seal around the periphery between sheets of filter paper, or simply by the contact of the rims of two "basket-shaped" metal mesh bodies which are connected to each other by a hinge.

Preferably, substantially all of the surface area of the sealed body is water-permeable. Such a sealed body can be, for example, an envelope-like structure, such as formed by the common tea bag, a circular sealed "pod", or a hinged metal basket-and-lid enclosure.

A sealed body of the tea extraction container has an internal space which forms at least one internal compartment for containing a tea composition. In one embodiment, a tea extraction container has more than one compartment. Such compartments can be "side-by-side" within the sealed body, or layered from top to bottom across the length of the sealed body. A container with more than one internal compartment is useful for containing a tea extract having components in addition to tea leaves or herbs. For example, tea blends including additional spices and/or sweeteners can be contained in internal compartments which are separated from the internal compartment containing the tea leaves/herbs. Typically, the internal compartments of a tea extraction container are formed by walls within the internal space of the sealed body, which divide the internal space into two or more compartments. In tea extraction containers having more than one compartment, the walls separating the compartments are preferably constructed from the same water-permeable material as the rest of the sealed body so that the extracts from the different compartments can mix to provide optimum flavor. Separation of the various ingredients of a tea composition of the present invention reduces any problems associated with "clumping" together of different ingredients, which can result in loss of flavor, color and/or strength of the tea extract. It is to be noted, however, that the tea compositions set forth in the present invention have been specifically designed to be combined together in a tea extraction container having a single internal compartment to produce a high quality tea extract with excellent color, flavor and strength.

In one embodiment of the present invention, a tea extraction container for containing a tea such as a Chai tea has three internal compartments: one internal compartment for containing tea, at least one internal compartment for containing additional spices, and one internal compartment for containing a sweetener.

In another embodiment of the present invention, the various ingredients, or components, of a tea composition of the present invention can be placed into individual tea extraction containers, and each of the tea extraction containers can be placed into a coffee brewing device together in the method for making a tea extract as described in detail below. In this embodiment, each of the tea extraction containers would preferably have only one compartment, each container enclosing a different ingredient of the tea composition (e.g., one with tea leaves, one with spices, and one with sweetener). This embodiment offers the advantage of being able to selectively combine various ingredients to vary the type of tea extract produced (e.g., sweetened vs. unsweetened, spiced vs. unspiced, added milk, added fruit flavor, etc). More particularly, each individual tea extraction container can contain a tea, or a blend of teas and/or herbs. Optionally, depending on the desired type of tea, an additional component can be added to one or more of the containers to create a completely customized and variable tea beverage. Additional components useful to produce such a tea extract include, but are not limited to, one or more spices, sweeteners, milk products (e.g., powdered milks and creamers), jams, preserves, fresh fruits, and/or mixtures thereof. Such an advantage provided by the tea system and method of the present invention has been heretofore unknown in the retail tea industry. Using the novel tea extract system and method of the present invention, it is now possible to produce customized, single service preparations of virtually any type of tea blend or tea beverage, in a very short time, at a low cost, and with very low effort on the part of the producer. Such flexibility, cost efficiency, and ease of use is extremely desirable in the retail tea beverage industry.

In one embodiment of the present invention, different tea extraction containers are connected together by a connecting means. Such a connecting means can be any means sufficient to attach one tea extraction container to another. Preferably, the connecting means creates a flexible connection between the containers so that one container can be folded on top of another. Such a connecting means can be used to connect two, three, or more containers to each other. Preferably, two (double) or three (triple) containers are connected together. A double tea extraction container of the present invention is illustrated in FIGS. 2A and 2B. FIG. 2A is a top view of a double tea extraction container (30), showing two sealed bodies (22) each comprised of a water-permeable filter paper, having a sealed edge (24) enclosing an internal compartment (26) which contains the tea composition (not shown). The sealed bodies may optionally include a component such a spice, a sweetener, a milk product, jams, preserves, fresh fruits, and/or mixtures thereof. The sealed bodies are connected by a connecting means (32), which in this illustration is an merging of the sealed edges (24) of the two sealed bodies (22) into each other. FIG. 2B is a cross-sectional side view of the same double extraction container (30), showing the tea composition (28) contained within the internal compartment (26) and the connecting means (32) flexing to allow the three sealed bodies (22) to fold up, one on top of the other.

FIGS. 3A and 3B illustrate a triple tea extraction container of the present invention. FIG. 3A is a top view of a triple tea extraction container (34), showing three sealed bodies (22) each comprised of a water-permeable filter paper, having a sealed edge (24) enclosing an internal compartment (26) which contains the tea composition. As above, the sealed bodies may optionally include a component such a spice, a sweetener, a milk product, jams, preserves, fresh fruits, and/or mixtures thereof. In this illustration, the sealed bodies (22) are connected in a row by a connecting means (32). FIG. 3B is a cross-sectional side view of the same triple extraction container (34), showing the tea composition (28) contained within the internal compartment (26), and the connecting means (32) flexing to allow the three sealed bodies (22) to fold up, one on top of the other.

In yet another embodiment of the present invention, a tea extraction system can be configured as a rigid container having multiple tea extraction containers connected to each other at the side of the sealed bodies, from top to bottom, around an axial member. Such an embodiment is illustrated for example, in FIG. 4. FIG. 4 illustrates a side-view of a tea extraction system in which three tea extraction containers (36), preferably formed of a rigid material, such as metal, are connected to one another by a connecting means (38) comprising an axial member (40) that allows the individual tea extraction containers (36) to be rotated around the axial member (40) independently of one another. For use in a coffee brewing device, the containers (36) are arranged to overlap from top to bottom, substantially as illustrated in FIG. 4.

As discussed above, the present inventors have discovered that the production of quality tea extracts according to the present invention can not be accomplished by following the guidance provided for coffee pods and espresso brews as disclosed by others prior to the present invention. Similarly, traditional tea blends contained in tea bags are also unsuitable for use in a coffee brewing device (i.e., one could not merely place a commercially available tea bag into a coffee brewing device and obtain the tea extract of the present invention). Therefore, the present inventors have developed and disclose herein tea compositions for use in the tea extraction system of the present invention which will consistently produce high quality tea extracts from a coffee brewing device, and particularly, an espresso machine. Prior to the present invention, it was not appreciated that the quality of tea compositions for use in a coffee brewing device would be dependent upon cuts and blends of teas and additional spices that are not predictable from the knowledge of cuts and blends of teas used in the common tea bag or from the knowledge of coffee grinds and compaction levels required to produce high quality espresso.

According to the present invention, a tea composition is a composition that minimally includes at least one type of tea leaf or herbal preparation. A tea composition can further include blends of tea leaves, blends of herbs, spices and/or sweeteners.

As discussed above, one ingredient of a tea composition of the present invention is a tea selected from the group of tea leaves or herbs. Any tea or herb suitable for making a consumable tea or herbal tea beverage can be used in the composition and method of the present invention. Particularly suitable teas, herbs and spices for use in a tea composition and method of the present invention include, but are not limited to, black tea, green tea, Oolong tea, cinnamon, ginger, hibiscus, malted barley, chicory, lemon grass, chamomile, fennel, and licorice root. Other preferred teas for use in the present invention include co-fermented teas (i.e., teas that have been fermented during their standard manufacturing process with various herbs, spices and/or other additives to produce unique flavors), and flavored teas. According to the present invention, the term "tea" is used herein as a generic term which refers to traditional tea leaves, herbs, and blends of tea leaves and/or herbs, all of which can be used to produce a tea extract of the present invention. As such, the term "tea leaves" is used herein to denote the traditional tea leaves as known in the art (e.g., green tea leaves, Oolong tea leaves, black tea leaves), and the term "herbs" is used to refer to herbs that can be used to produce an herbal tea.

An amount of tea leaves or herbs suitable for use in a tea composition of the present invention for a single tea extraction container is an amount which is sufficient to make one serving of tea extract (i.e., an amount sufficient to prepare a tea beverage for one person, such as an 8-12 fluid ounce glass of iced tea, a 6–8 fluid ounce cup of hot tea, or an 8–12 fluid ounce mug of steamed milk and tea). Preferably, an amount of tea leaves or herbs suitable for use in a single serving of a tea composition of the present invention is from about 2 grams to about 10 grams of tea leaves or herbs. More preferably, from about 2 to about 8 grams of tea leaves or herbs are used, and even more preferably, from about 8 grams to about 9 grams of tea leaves or herbs are used, and even more preferably, from about 9 grams to about 10 grams of tea leaves or herbs are used in a single serving of a tea composition of the present invention. It is to be noted that the amount of tea leaves or herbs used to produce a single serving of tea composition of the present invention can be varied depending on the size or volume of the filter on the coffee brewing device used to make the tea.

According to the present invention, the tea or herb used in a tea composition of the present invention is of a particle size (i.e. length of leaf cut) that allows for good extraction of the tea and reasonable, but not excessive, expansion of the tea leaves or herbs during the extraction process in a coffee brewing device. Prior to the present invention, it was not appreciated that tea and/or herbs of a different particle size than the ranges disclosed herein, when extracted in a coffee brewing device, will clump and/or overexpand to block the flow of water through the tea. This clumping or overexpansion results in weak, colorless, and flavorless tea extracts.

Preferably, a tea leaf or herb used in a tea composition of the present invention has a particle size of greater than about 0.40 mm. Such a particle size preferably has a maximum size of about 0.75 mm, although some loose tea leaves can have a particle size of at least 1 cm. More preferably, a tea or herb used in a tea composition of the present invention has a particle size of from about 0.40 to about 0.75, more preferably from about 0.45 mm to about 0.75 mm, and more preferably from about 0.50 mm to about 0.70 mm, and even more preferably from about 0.50 mm to about 0.60 mm. In one embodiment of the present invention, the particle size of the tea or herb can be adjusted based on the relative darkness of the extract produced by the tea leaf or herb used. For example, tea leaves producing a stronger, darker tea, including, but not limited to black tea and/or Assam/Kenya tea, are preferably of a particle size of from about 0.40 mm to about 0.75 mm. Tea leaves producing a medium strength tea, including, but not limited to Ceylon/Indonesia tea and Oolong tea, are preferably of a particle size of from about 0.40 mm to about 0.60 mm. Finally, tea leaves or herbs producing a lighter strength tea, including, but not limited to, South India and/or Malawi, are preferably of a particle size of from about 0.60 mm to about 0.75 mm. In another embodiment of the present invention, loose leaf teas having a particle size of up to 3.5 cm can be used.

In another embodiment of the present invention, a tea composition can include one or more spices in addition to the tea or herb leaves. Particularly preferred spices for use in a tea composition of the present invention include, but are not limited to, cinnamon, ginger, cardamom, clove, nutmeg, pepper, and coriander. It is an embodiment of the present invention that one or any combination of spices can be used in a tea composition of the present invention according to the type of tea beverage desired.

According to the present invention, an amount of spices used in a tea composition of the present invention can be any amount required to impart the desired additional flavor to the tea extract of interest. Spices are added to a tea composition in an amount of from about 5% to about 80%, and preferably, about 40% to about 60% of the amount of tea or herb in the composition. An even more preferable amount of spice or spice mixture to use in a tea composition of the present invention is from about 40% to about 45% of the amount of tea or herb in the composition, and more preferably, from about 45% to about 50%, and even more preferably from about 50% to about 60% of the amount of tea or herb in the composition.

As discussed above, a spice or spice mixture can be blended with the tea leaves or herbs and added to a single compartment of a tea extraction container. Alternatively, a spice or spice mixture can be contained within a compartment of a tea extraction container that is separated from another compartment containing the tea leaves or herbs. Finally, in yet another embodiment, a spice or spice mixture can be contained within one tea extraction container, and combined with a second tea extraction container which contains tea leaves or herbs.

As discussed for tea leaves and herbs above, according to the present invention, a spice used in a tea composition of the present invention is of a particle size that allows for good extraction of the spice flavor and reasonable, but not excessive, expansion of the spices during the extraction process in a coffee brewing device. A spice can be added to a tea composition at a particle size of from about 0.45 mm to about 0.65 mm. Preferably, a spice or mixture of spices used in a tea composition of the present invention is of a particle size of from about 0.65 mm to about 0.60 mm, and more preferably of from about 0.60 mm to about 0.50 mm, and even more preferably of from about 0.50 mm to about 0.45 mm.

In yet another embodiment of the present invention, a tea composition can include a sweetener. Preferred sweeteners for use in a tea composition of the present invention are dry (i.e., solid or powdered) sweeteners. A sweetener useful in a tea composition of the present invention can include, but is not limited to, sugar, powdered honey, jams, preserves, fresh fruit (cut or ground), sugar cane pieces, saccharin and aspartame.

According to the present invention, an amount of sweetener used in a tea composition of the present invention can be any amount required to impart the desired sweetness to the tea extract of interest. A sweetener can be added in an amount that is from about 1% to about 70%, and preferably, about 20% to about 60% of the total amount of tea leaves added. An even more preferable amount of sweetener to use in a tea composition of the present invention is from about 20% to about 30% of the amount of tea or herb in the composition, and more preferably, from about 30% to about 40%, and even more preferably from about 40% to about 60% of the amount of tea or herb in the composition.

As discussed above, a sweetener can be blended with the tea leaves or herbs, and spices, if present, and added to a single compartment of a tea extraction container. Alternatively, a sweetener can be contained within a compartment of a tea extraction container that is separated from the compartment containing the tea leaves or herbs, or spices. In yet another embodiment, a sweetener can be contained within one tea extraction container, and combined with a second tea extraction container which contains tea leaves or herbs, and possibly a third tea extraction container which contains spices. Finally, a sweetener can be added in a desired amount in loose form (i.e., not contained within a tea extraction container) to the filter of a coffee brewing device which contains one or more tea extraction containers containing a tea composition.

A sweetener used in a tea composition of the present invention can be any particle size which readily dissolves into a tea extract produced by the method of the present invention. A sweetener is typically of a particle size provided by a commercial vendor of the sweetener. For example, if the sweetener is sugar, commercial grade granulated sugar may be used.

As discussed above, the amounts of tea composition disclosed herein are sufficient to produce a single (i.e., one) serving of tea extract per tea extraction container which can be used to make a single tea beverage. It is within the scope of the present invention, however, that the amounts of ingredients within a given tea composition can be adjusted to provide a tea extraction system which produces two, three, or more servings of tea extract per tea extraction container. The total amount of tea composition used in a tea extraction container for a single serving of tea extract is from about 2 grams to about 10 grams, and preferably from about 2 grams to about 8 grams, and more preferably from about 8 grams to about 9 grams, and even more preferably from about 9 grams to about 10 grams. The total amount of tea composition used in the tea extraction system of the present invention can be varied depending on the volume of the coffee brewing chamber (e.g., the porto filter) of the coffee brewing device used to make the tea extract.

A preferred embodiment of the present invention is a tea composition for producing a Chai tea extract. The ingredients in a Chai tea composition of the present invention preferably include, but are not limited to, black tea leaves, cinnamon, ginger, cardamom, cloves, nutmeg, pepper, and a sweetener. Preferably, a Chai tea composition of the present invention includes from about 1 to about 4 grams of black tea leaves of a particle size from about 0.40 mm to about 0.75 mm; from about 1 to about 10.5 grams of cinnamon of a particle size from about 0.45 mm to about 0.50 mm; from about 2 to about 4 grams of ginger of a particle size from about 0.50 mm to about 0.75 mm; from about 1 to about 2 grams of cardamom of a particle size from about 0.50 mm to about 0.60 mm; from about 0.5 to about 1 grams of cloves of a particle size from about 0.25 mm to about 0.35 mm; from about 0.1 to about 0.3 grams of nutmeg of a particle size from about 0.10 mm to about 0.15 mm; from about 0.1 to about 0.8 grams of pepper of a particle size from about 0.50 mm to about 0.60 mm; and from about 1 gram to about 6 grams of a sweetener. According to the present invention, a black tea useful in a Chai tea composition of the present invention includes, but is not limited to, Pekoe Dust Black Tea, Pekoe Fannings, Fannings, Dust 1, Dust, Broken Orange P.F., interim grades (i.e., an art-recognized term for "off grades" that occur in tea) and blends thereof. A sweetener useful in a Chai tea composition of the present invention includes, but is not limited to, any of the heretofore mentioned sweeteners.

Yet another embodiment of the present invention includes tea compositions having additional ingredients for enhancing the flavor of the tea composition. Such additional ingredients include the spices and sweeteners described above, as well as instant tea powder or instant tea granules. Moreover, for example, such additional ingredients include, but are not limited to, powdered milk (added at about 2% to about 50%, and preferably, about 20% to about 30% of the amount of tea or herb in the composition), powdered creamer (added at about 2% to about 50%, and preferably, about 20% to about 30% of the amount of tea or herb in the composition), jams (added at about 2% to about 50%, and preferably, about 20% to about 50% of the amount of tea or herb in the composition), preserves (added at about 2% to about 50%, and preferably, about 20% to about 50% of the amount of tea or herb in the composition), and/or fresh fruits (cut or ground to a particle size of from about 0.45 mm to about 0.75 mm and added at about 2% to about 60%, and preferably, about 20% to about 60% of the amount of tea or herb in the composition).

Another embodiment of the present invention relates to a method for producing a tea extract in a coffee brewing device, and particularly, an espresso machine. Such a method includes the steps of (a) providing a tea extract system which includes a tea extraction container and a tea composition as described in detail above; (b) placing the tea extraction system into the brewing chamber of a coffee brewing device; and, (c) operating the coffee brewing device to extract a tea extract from the tea composition.

As used herein, a coffee brewing device can be any device that is suitable for brewing a coffee. Preferably, such a device is an espresso machine. Espresso machines are well known in the art, and include steam and pump-driven machines and piston-driven machines. Such coffee brewing devices typically have a brewing chamber, which as used herein, is a chamber that is designed to hold the ground coffee to be brewed by the brewing device. Such a chamber typically includes a filter. Filters and adaptors for holding ground coffee, and particularly, coffee pods, are known in the art (see for example, U.S. Pat. No. 5,638,741, supra). During operation of the coffee brewing device, hot water (pressurized hot water, in the case of some espresso machines) is introduced into the brewing chamber, passing through the coffee and filter, thereby extracting the brewed extract (e.g., coffee) from the ground coffee in the brewing chamber, and dispensing the extract from an orifice in the device.

In the method of the present invention, a tea extraction system as described herein is placed into the brewing chamber of a coffee brewing device. Upon operation of the machine, a high quality, reproducible, tea extract is extracted from the tea composition of the present invention, which can be used to make a tea beverage. According to the present invention, the step of placing the tea extraction system into the coffee brewing chamber can be accomplished by simply setting the tea extraction container into the empty chamber. Positioning of the tea extraction system and/or or removing of the chamber may be necessary, depending on the design of the coffee brewing chamber, but should be a simple matter for one familiar with the particular coffee brewing device. Operating the coffee brewing device refers collectively to the series of steps which are performed to produce an extracted beverage from the device, for example, according to the device manufacturer's directions. Such steps typically include providing a water supply to the device, performing a function which seals the coffee brewing chamber so that the water can be introduced directly into to the chamber (and, in the case of some espresso machines, under pressure), and activating the brewing device by pressing a button or similar activating means. The tea extract is then collected in a vessel or container of choice from the dispensing orifice in the coffee brewing device.

As discussed above, the tea extraction system used in the method for producing a tea extract in a coffee brewing device can be added to the empty coffee brewing chamber as a single tea extraction container containing a tea composition of the present invention, or alternatively, more than one tea extraction container, each containing a different component of the tea composition (e.g., tea, spice, sweetener), can be added to the coffee brewing chamber. According to the present invention, a tea extract system which includes one or more tea extraction containers as described above, typically provides a single serving of tea beverage. It is within the scope of the present invention, however, that two or more tea extraction containers, each containing a tea composition sufficient to produce one serving of tea beverage, can be placed together into a coffee brewing device to produce additional servings of tea beverage, or to increase the strength of a single serving, as desired by the consumer of the tea beverage. In yet another embodiment, the tea composition can be added to the coffee brewing chamber in the absence of a tea extraction container (i.e., as "loose" particles of tea and other ingredients). In yet another embodiment of the present invention, the tea composition can be added with some of the ingredients contained within a tea extraction container and some of the ingredients added as loose ingredients in the absence of a tea extraction container. For example, it may be desirable to provide a tea extraction system comprising one or more tea extraction containers containing an unsweetened tea composition of the present invention, and then adding the desired sweetener in loose form directly to the coffee brewing chamber with the tea extraction container. These various embodiments allow the tea brewer a great deal of flexibility in preparing a variety of tea extracts (e.g., sweetened or non-sweetened, spiced or non-spiced, blends of teas or single tea types, etc.). Using the novel tea compositions and method disclosed herein, it is a simple matter for any home or retail operator to consistently and reproducibly prepare a wide variety of high quality tea beverages in any coffee brewing device, including an espresso machine, in a very short period of time.

Once the tea extract is collected from the dispensing orifice of the coffee brewing device, the extract can be used to prepare any of a variety of tea-based beverages. It should be noted that the operator of the coffee brewing device may be able to control the amount of water used to extract the tea composition, thereby varying the strength of the resulting tea extract depending on the desired tea beverage. For example, a particular volume of the tea extract (e.g., 8 fluid ounces) can be consumed as extracted as a hot tea beverage. Alternatively, the tea extract can be collected over ice to produce a glass of iced tea. In another embodiment, a Chai tea composition as described herein can be extracted to produce about 1 fluid ounce of tea extract. The tea extract can then be added to about 6 fluid ounces of steamed milk to produce a single serving of hot Chai tea. Additionally, as described above, a particular advantage of the tea extract system of the present invention is that the operator of the coffee brewing device can control the strength, sweetness, and composition of the tea extract simply by selecting (i.e., mixing and matching) tea extraction containers having the desired teas and/or additional components.

According to the present invention, the selection and operation processes (i.e., the production of a tea extract of the present invention) is preferably accomplished in less than about 60 seconds, and more preferably less than about 40 seconds, and even more preferably in less than about 20 seconds. As discussed previously herein, the method and tea extract system of the present invention provide the consumer with a customized, freshly brewed tea beverage in a very short period of time. The ability to produce such a variety of fresh tea beverages has not been available prior to the present invention.

It is to be understood that the general method and principles disclosed herein can be extrapolated to the production of other liquid extracts using espresso technology. For example, one could use the method and composition guidelines disclosed herein to produce a bouillon extract and/or a sealed body of herbs to produce an extract that can be added to a soup, stew or sauce.

The following examples are provided for the purposes of illustration and are not intended to limit the scope of the present invention.

EXAMPLES

The following experiments demonstrate that the tea extraction systems and the method disclosed in the present invention reproducibly produce a high quality tea extract for use in tea beverages.

Each of the experiments described below was performed in an espresso machine using an espresso porto filter as the coffee brewing chamber. Each experiment was repeated with a steam and pump driven espresso machine produced by each of the following manufacturers: Krups®, Braun®, and also with a Pavolini piston driven espresso machine. Each of the following experiments were also performed once with a pod of paper as indicated in the description of the experiments below. These experiments were also performed using a tight weave metal mesh basket hinged on the top and bottom instead of the paper pod, (using Braun® and Krups® machines) although the espresso machine used was not of the compression/plunger type in this case. The results were uniformly the same in each experiment.

In the experiments in which sweeteners were used, each experiment was repeated with the following different types of sweeteners: saccharin, aspartame, sugar, and powdered honey.

Example 1

The following experiment describes a Chai tea extract which was not prepared using the tea composition and method of the present invention, resulting in a Chai tea extract having poor quality.

A Chai spice tea blend of black tea having a particle size of about 0.45 mm, and the following spices: cinnamon, cardamom, cloves, nutmeg and pepper, was prepared. Each spice had been milled to go through a U.S. Testing Sieve Tyler equivalent 20 mesh screen with a minimum of 5% dust on the pan. 8 grams of the blend was placed in a pod of paper. The pod was placed in an espresso porto filter and locked the handle in position. The hot water extraction button was pressed to extract two shot glasses (e.g., about 2 fluid ounces) of extract. This extract was then added to about 8 fluid ounces of steamed milk for an Chai tea brew. The taste of the Chai tea was weak. The pod was examined and it was found that the mixture of herbs had expanded and blocked the flow of water through the pod.

Based on this experiment, it is clear that the particle size of the tea composition must be designed to allow for extraction and reasonable expansion of the tea blend without blocking the porto filter.

Example 2

The following experiment describes a Chai tea extract which was not prepared using the tea composition and method of the present invention, resulting in a Chai tea extract having poor quality.

A Chai tea composition as described in Example 1 was prepared, but in this experiment, the spices were milled to a fine particle size (about 0.5525 mm). 8 grams of these ingredients as outlined in Experiment #1 (i.e., including the black tea) were then placed in a pod and the pod was brewed in an espresso machine, extracting two shot glasses (about 2 fluid ounces) of extract. The extract was added to steamed milk. It was again determined that the final brew lacked color and spiciness.

Example 3

The following experiment describes a Chai tea extract which was prepared using the tea composition and method of the present invention, resulting in a Chai tea extract having good quality.

In this experiment, a new tea blend was created using a Pekoe Dust Black Tea grade of tea having a particle size of about 0.45 mm, and finely ground spices (about 0.5525 mm) as prepared in Example 2. This blend was encased in a pod. The pod was placed in the porto filter and extracted as outlined in Examples 1 and 2. The extract was collected in two shot glasses and mixed with about 8 fluid ounces of steamed milk. This extract had excellent color and spice taste. It was determined, however, that the resulting tea lacked the sweetness normally associated with Chai, and so a sweetener was added to the tea composition prior to extracting the tea.

Using the same tea composition ingredients as above, 3 grams of aspartame artificial sweetener were added to the composition, and the composition was encased in a pod. The pod was placed in the porto filter and brewed as outlined in Examples 1 and 2. The resulting Chai tea beverage had excellent color, taste and sweetness.

The same experiment was repeated, except that 3 grams of saccharin artificial sweetener was added to the composition instead of aspartame. The resulting Chai tea beverage had excellent color, taste and sweetness.

The same experiment was again repeated, except that 5 grams of powdered honey was added to the composition instead of aspartame. The resulting Chai tea beverage had excellent color, taste and sweetness.

Example 4

The following experiment describes a Chai tea extract which was prepared using the tea composition and method of the present invention, resulting in a Chai tea extract having good quality.

8 grams of a blend of spices, each of which had been milled to go through a U.S. Testing Sieve Tyler equivalent 20 mesh screen with a minimum of 5% dust on the pan, was placed in a pod of paper. A second pod that contained 8 grams of a Pekoe Dust Black tea of a particle size of about 0.40 mm was also placed in the porto filter. Finally, 8 grams of sugar was added to the filter in loose form and the handle was locked in position. The hot water extraction button was pressed and just under one shot glass (less than one fluid ounce) of extract was extracted. This extract was then added to about 8 fluid ounces of steamed milk to produce a spice tea brew. The resulting brew had excellent color, taste and sweetness.

The above experiment was then repeated, except that ice was added to the brew. The resulting beverage was an excellent iced Chai tea.

Example 5

The following experiment describes an herbal tea extract which was prepared using the tea composition and method of the present invention, resulting in an herbal tea extract having good quality.

An herbal blend was created by milling a mixture of hibiscus (75%), licorice root (15%) and rosehips (10%) to a particle size of about 0.5525 mm. 8 grams of the herbal tea composition were then encased in a pod, the pod was placed in the porto filter and brewed as outlined in Example 4 above. The extract was collected in two shot glasses (total of about 2 fluid ounces). The extract was poured into a 12 fluid ounce glass and ice and water were added to fill the glass. An excellent herb iced tea was the result.

Example 6

The following experiment describes a Chai tea extract which was prepared using the tea composition and method of the present invention, resulting in a Chai tea extract having good quality.

In this experiment, a blend of spices (20% cinnamon, 35% ginger, 23% cardamon, 10% cloves, 4% nutmeg, and 8% pepper) was milled to go through a U.S. Testing Sieve Tyler equivalent 20 mesh screen with a minimum of 5% dust on the pan. 8 grams of the blend were placed in a pod of paper and the pod was placed in an espresso porto filter. A second pod containing 8 grams of a Pekoe Dust Black tea having a particle size of about 0.45 mm was placed in the porto filter with the pod containing the spices. 8 grams of sugar were added in loose form to the filter, and the handle was locked in position. 6 fluid ounces of hot milk in a 12 ounce glass were placed under the extract dispensing spout. The free flow hot water button was activated, causing the tea extract to flow from the porto filter in a steady stream into the glass of milk to a total of about 12 fluid ounces. The result was an excellent Chai spice drink.

Example 7

The following experiment describes an herbal tea extract which was prepared using the tea composition and method of the present invention, resulting in an herbal tea extract having good quality.

An herb blend was created by milling 70% hibiscus, 20% licorice root, and 10% rosehips to a particle size of about 0.60 mm (hibiscus), about 0.35 mm (licorice root) and about 0.45 mm (rosehips). 8 grams of the herbal blend was encased in a pod and the pod was placed in the porto filter with 8 grams of sugar in loose form. A 12 fluid ounce glass of ice was placed under the spouts and the measured, free flow hot water button was pressed. The herbal tea extract flowed from the porto filter in a steady stream into the glass of ice. When the glass was full, the flow was stopped and the ice was stirred. The result was an excellent glass of sweetened herb iced tea, produced in less than about 40 seconds.

In a second experiment, 8 grams of the same herb blend used above was encased in a pod and placed in a porto filter with 8 grams of sugar in loose form. A 12 fluid ounce mug was placed under the spouts and the measured, free flow hot water button was pressed. The herbal tea extract flowed from the porto filter in a steady stream. When the mug was full, the flow was stopped. The result was an excellent mug of herb tea, produced in less than about 40 seconds.

The above experiment was again repeated using the same herbal tea blend, but substituting 4 grams of aspartame artificial sweetener for the sugar used above. The extract was collected over ice to fill a 12 fluid ounce glass. An excellent sweetened iced tea was the result, produced in less than about 40 seconds.

Example 8

The following experiment describes a black tea extract which was prepared using the tea composition and method of the present invention, resulting in a black extract having good quality.

10 grams of Pekoe Dust Black Tea of a particle size of about 0.40 mm was encased in a pod, and the pod was placed in the porto filter with 8 grams of sugar in loose form. A 12 fluid ounce glass of ice was placed under the spouts and the measured, free flow hot water button was pressed. The tea extract flowed from the porto filter in a steady stream into the glass of ice. When the glass was full, the flow was stopped, and the ice was stirred. The result was an excellent glass of sweetened iced tea which had very good color and flavor.

The above experiment was repeated, but this time, no sweetener was used. The result was a clear, natural glass of iced tea with very good color and unsweetned tea flavor.

Example 9

The following experiment describes a blended tea extract which was prepared using the tea composition and method of the present invention, resulting in a blended tea extract having good quality.

A blend of black teas was created which included: 40% Ceylon, Broken Orange and Pekoe Fannings, milled to a particle size of about 0.65 mm; 40% Kenya and Pekoe Fannings, milled to a particle size of about 0.55 mm; and Assam and Pekoe Dust, milled to a particle size of about 0.40 mm. 8 grams of the blend were encased in a pod of paper, the pod was placed in an espresso porto filter, and the handle was locked in position. The hot water extraction button was pressed and two shot glasses of extract (about 2 fluid ounces) were extracted. This extract was then placed in a 12 fluid ounce mug and hot water added to within an inch of the lip. An excellent mug of black tea was the result.

Example 10

The following experiment describes a blended tea extract which was prepared using the tea composition and method of the present invention, resulting in a blended tea extract having good quality.

The blend of black teas as described above in Example 9 was blended with Ceylon BOPF and Kenya P.F. which had been milled through a U.S. TESTING Sieve Tyler equivalent 20 mesh screen with a minimum of 4% dust on the pan. 8 grams of the blend was incased in a pod of paper, the pod was placed in an espresso porto filter, and the handle was locked in position.

A 12 fluid ounce mug was placed under the spouts and the measured, free flow hot water button was pressed. The water flowed from the porto filter in a steady stream into the mug. The result was an excellent mug of tea.

The above experiment was repeated, except that this time, about 10.5 fluid ounces of milk was added to the finished cup of tea. An excellent mug of unsweetened tea was the result.

Example 11

The following experiment describes a tea extract which was prepared using the tea composition and method of the present invention, resulting in a tea extract having good quality.

In this experiment, 10 grams of loose leaf Flowery Orange Pekoe and Orange Pekoe teas having a length of about 1 cm were placed in the porto filter without the benefit of a pod or brew basket. A 12 fluid ounce glass or mug of ice was placed under the spouts and the measured, free flow hot water button was pressed. The tea extract flowed from the porto filter in a steady stream into the glass of ice. When the glass was full the flow was stopped, and the ice was stirred. The result was an excellent glass of iced tea which had very good color and flavor.

The entire process from placing the tea in the porto filter to taking the first sip of iced tea took less than about 40 seconds.

The above experiment was repeated, but this time, a mug was placed under the spouts. The tea extract flowed from the porto filter in a steady stream into the mug. When the mug was full, the flow was stopped. The result was an excellent mug of hot tea having very good color and flavor.

Again, the entire process from placing the tea in the porto filter to taking the first sip of took less than about 40 seconds.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims:

What is claimed is:

1. A tea extract system for production of a serving of tea extract in a coffee brewing device, comprising:
   (a) a tea extraction container for containing a tea composition, said tea extraction container comprising a sealed body having at least one internal compartment, said internal compartment containing said tea composition;
   wherein said sealed body is constructed of a water-permeable material which allows flow of a fluid through said sealed body to produce a tea extract from said tea composition; and,
   (b) a tea composition comprising from about 2 grams to about 10 grams of tea having a particle size of from about 0.40 mm to about 0.75 mm.

2. The tea extract system of claim 1, wherein said tea composition is selected from the group consisting of tea leaves producing a dark strength tea, tea leaves producing a medium strength tea, tea leaves producing a light strength tea, herbs, and mixtures thereof.

3. The tea extract system of claim 2, wherein said tea leaves producing a dark strength tea are selected from the group consisting of black tea, Assam/Kenya teas and mixtures thereof.

4. The tea extract system of claim 2, wherein said tea leaves producing a medium strength tea are a Ceylon/Indonesia tea and Oolong tea.

5. The tea extract system of claim 2, wherein said tea leaves producing a light strength tea are a South India/Malawi tea.

6. The tea extract system of claim 2, wherein said herbs are selected from the group consisting of cinnamon, ginger, hibiscus, malted barley, chicory, lemon grass, chamomile, fennel, licorice root and mixtures thereof.

7. The tea extract system of claim 2, wherein said tea composition comprises from about 2 grams to about 10 grams of said tea leaves producing a dark strength tea having a particle size of from about 0.40 mm to about 0.75 mm.

8. The tea extract system of claim 2, wherein said tea composition comprises from about 2 grams to about 10 grams of said tea leaves producing a medium strength tea having a particle size of from about 0.40 mm to about 0.60 mm.

9. The tea extract system of claim 2, wherein said tea composition comprises from about 2 grams to about 10 grams of said tea leaves producing a light strength tea having a particle size of from about 0.60 mm to about 0.75 mm.

10. The tea extract system of claim 2, wherein said tea composition comprises from about 2 grams to about 10 grams of said herbs having a particle size of from about 0.45 mm to about 0.75 mm.

11. The tea extract system of claim 1, wherein said tea composition further comprises a sweetener.

12. The tea extract system of claim 1, wherein said tea composition further comprises at least one spice.

13. The tea extract system of claim 12, wherein said spice is contained within a different internal compartment of said tea extraction container than said tea.

14. The tea extract system of claim 12, wherein said spice is selected from the group consisting of cinnamon, ginger, cardamom, clove, nutmeg, pepper, coriander and mixtures thereof.

15. The tea extract system of claim 1, wherein said tea extract system further comprises at least one additional tea extraction container that contains at least one additional component, said additional component selected from the group consisting of at least one spice, added to said tea composition in an amount from about 5% to about 80% of a total amount of said tea, wherein said spice is ground to a particle size of from about 0.45 mm to about 0.65 mm; a sweetener added in an amount from about 1% to about 70% of a total amount of said tea; a powdered milk added in an amount from about 2% to about 50% of a total amount of said tea; a powdered creamer added in an amount from about 2% to about 50% of a total amount of said tea; a jam in an amount from about 2% to about 50% of a total amount of said tea; preserves added in an amount from about 2% to about 50% of a total amount of said tea; fresh fruits cut or ground to a particle size of from about 0.45 mm to about 0.75 mm, added in an amount from about 2% to about 60% of a total amount of said tea; and mixtures thereof.

16. The tea extract system of claim 1, wherein said tea extract system further comprises at least one additional tea extraction container that contains at least one additional component, said additional component selected from the group consisting of at least one spice, added to said tea composition in an amount from about 40% to about 60% of a total amount of said tea, wherein said spice is ground to a particle size of from about 0.45 mm to about 0.65 mm; a sweetener added in an amount from about 20% to about 60% of a total amount of said tea; a powdered milk added in an amount from about 20% to about 30% of a total amount of said tea; a powdered creamer added in an amount from about 20% to about 30% of a total amount of said tea; a jam in an amount from about 20% to about 50% of a total amount of said tea; preserves added in an amount from about 20% to about 50% of a total amount of said tea; fresh fruits cut or ground to a particle size of from about 0.45 mm to about 0.75 mm, added in an amount from about 20% to about 60% of a total amount of said tea; and mixtures thereof.

17. The tea extract system of claim 16, wherein said tea extraction container and said at least one additional tea extraction container are connected to each other by a connecting means.

18. A tea extract system for production of a spiced tea extract in a coffee brewing device, comprising:
(a) a tea extraction container for containing a tea composition, said tea extraction container comprising at least one sealed body having at least one internal compartment, said internal compartment containing said tea composition;
wherein said sealed body is constructed of a water-permeable material which allows flow of a fluid through said sealed body to produce a tea extract from said tea composition; and,
(b) a tea composition comprising:
(i) from about 2 grams to about 10 grams of a tea selected from the group consisting of tea leaves producing a dark strength tea having a particle size from about 0.40 mm to about 0.75 mm; tea leaves producing a medium strength tea having a particle size from about 0.40 mm to about 0.60 mm; tea leaves producing a light strength tea having a particle size from about 0.60 mm to about 0.75 mm; and herbs having a particle size from about 0.50 mm to about 0.75 mm;
(ii) at least one spice, added to said tea composition in an amount from about 40% to about 60% of a total amount of said tea, wherein said spice is ground to a particle size of from about 0.45 mm to about 0.65 mm; and,
(iii) a sweetener, added in an amount from about 20% to about 60% of a total amount of said tea.

19. The tea extract system of claim 18, wherein said tea extraction container has three internal compartments, and wherein each of said tea, spice, and sweetener is contained in a different internal compartment within said tea extraction container.

20. A tea composition for producing a tea extract in an espresso machine, comprising from about 2 grams to about 10 grams of a tea having a particle size of from about 0.40 mm to about 0.75 mm.

21. A method for producing a tea extract in a coffee brewing device, comprising the steps of:
(a) providing a tea extract system comprising:
(i) a tea extraction container for containing a tea composition, said tea extraction container comprising a sealed body having at least one internal compartment, said internal compartment containing said tea composition;
wherein said sealed body is constructed of a water-permeable material which allows flow of a fluid through said sealed body to produce a tea extract from said tea composition; and,
(ii) a tea composition comprising from about 2 grams to about 10 grams of a tea having a particle size of from about 0.40 mm to about 0.75 mm;
(b) placing said tea extraction system into a brewing chamber of a coffee brewing device; and,
(c) operating said coffee brewing device to extract a tea extract from said tea composition.

22. The method of claim 21, wherein said tea extract is produced in less than about 60 seconds after initiating step (a) of providing.

23. The method of claim 21, wherein said tea extract is produced in less than about 40 seconds after initiating step (a) of providing.

24. A method for preparing a single serving of a customized tea beverage in a coffee brewing device, comprising:
(a) selecting a customized tea extract system comprising:
(i) a first tea extraction container containing a tea composition;
said first tea extraction container comprising a sealed body having at least one internal compartment, said internal compartment containing a tea composition;
wherein said sealed body is constructed of a water-permeable material which allows flow of a fluid through said sealed body to produce a tea extract from said tea composition;
said tea composition comprising from about 2 grams to about 10 grams of a tea selected from the group consisting of tea leaves producing a dark strength tea having a particle size of from about 0.40 mm to about 0.75 mm; tea leaves producing a medium strength tea having a particle size from about 0.40 mm to about 0.60 mm; tea leaves producing a light strength tea having a particle size from about 0.60 mm to about 0.75 mm; and, herbs having a particle size from about 0.50 mm to about 0.75 mm; and mixtures thereof; and, (ii) at least one optional tea extraction container containing at least one component selected from the group consisting of at least one spice, added to said tea composition in an amount from about 40% to about 60% of a total amount of said tea, wherein said spice is ground to a particle size of from about 0.45 mm to about 0.65 mm; a sweetener added in an amount from about 20% to about 60% of a total amount of said tea; a powdered milk added in an amount from about 20% to about 30% of a total amount of said tea; a powdered creamer added in an amount from about 20% to about 30% of a total amount of said tea; a jam in an amount from about 20% to about 50% of a total amount of said tea; preserves added in an amount from about 20% to about 50% of a total amount of said tea; fresh fruits cut or ground to a particle size of from about 0.45 mm to about 0.75 mm, added in an amount from about 20% to about 60% of a total amount of said tea; and mixtures thereof; and, (b) placing said first tea extraction container together with said at least one optional tea extraction container into a brewing chamber of a coffee brewing device; and, (c) operating said coffee brewing device to extract a customized tea extract from said tea composition.

25. The method of claim 24, wherein said tea extract is produced in less than about 40 seconds after initiating said step (a) of selecting.

26. A tea composition for producing a Chai tea extract in an espresso machine, comprising from about 1 to about 4 grams of black tea leaves of a particle size from about 0.40 mm to about 0.75 mm; from about 1 to about 10.5 grams of cinnamon of a particle size from about 0.45 mm to about 0.50 mm; from about 2 to about 4 grams of ginger of a particle size from about 0.50 mm to about 0.75 mm; from about 1 to about 2 grams of cardamom of a particle size from about 0.50 mm to about 0.60 mm; from about 0.5 to about 1 grams of cloves of a particle size from about 0.25 mm to about 0.35 mm; from about 0.1 to about 0.3 grams of nutmeg of a particle size from about 0.10 mm to about 0.15 mm; from about 0.1 to about 0.8 grams of pepper of a particle size from about 0.50 mm to about 0.60 mm; and from about 3 to about 6 grams of a sweetener.

* * * * *